Patented Aug. 23, 1949

2,479,988

UNITED STATES PATENT OFFICE 2,479,988

ANTICORROSIVE PAINT

Francis J. Williams, Port Washington, and Edgar H. Herrmann, Brooklyn, N. Y., assignors to National Lead Company, New York, N. Y., a corporation of New Jersey No Drawing. Application February 14, 1947, Serial No. 728,722

9 Claims. (Cl. 106—14)

This invention relates to protective coatings and more particularly to that class of paints used for protection of metallic surfaces such as iron and steel.

Paints having as a major pigment constituent, red lead, lead chromate, or, to a limited extent, basic lead sulphate, have generally been heretofore used for protection of iron and steel surfaces against the effects of corrosive exposure.

It is the object of the present invention to provide a coating composition useful for the protection of metal surfaces containing a lead pigment having a lower lead content than formerly. It is another object of this invention to provide a surface coating composition having good covering qualities, light color and excellent anti-corrosive properties when applied to metallic surfaces. It is a further object of the invention to provide a metal protective paint having excellent anti-corrosive properties when exposed either to the atmosphere or under water. These and other objects will become apparent as the description thereof proceeds.

This invention, in its broadest aspects contemplates a surface coating composition, e. g. a paint, containing a pigment comprising an alkaline earth metal plumbate, and a suitable vehicle. The alkali earth metal plumbate may be considered a chemical combination of an alkaline earth metal oxide with lead oxide, and it is essential that the lead oxide content so combined be substantially wholly present in the form of lead peroxide, $PbO_2$.

The alkaline earth metal oxide may consist of either or any combination of those commonly grouped as such, e. g. CaO, BaO and SrO. Calcium plumbate is characterized by a light buff color, barium plumbate is black, and strontium plumbate is dark brown. In the case of calcium and strontium plumbates, it is preferable to form the orthoplumbate compounds, $Ca_2PbO_4$ or $Sr_2PbO_4$, since these are more readily obtained containing the required high percentage of lead in the form of combined $PbO_2$. This is not the case with barium plumbates, however, both the ortho-salt, $Ba_2PbO_4$, and the meta-salt, $BaPbO_3$, being readily produced in a form suitable for use in the paint compositions of this invention and either of these compounds or combinations of intermediate molecular proportions may be so employed.

The alkaline earth metal plumbate may be manufactured by first intimately mixing powdered alkaline earth metal oxide and lead oxide, PbO, in stoichiometric proportions to produce the orthoplumbate compound. Alternatively, salts which will produce alkaline earth metal oxides on heating, e. g. $Ca(OH)_2$ or $BaCO_3$, may be used, and lead salts which will produce PbO or $PbO_2$ on heating, or red lead may be substituted for the PbO. The mixture is then heated in a furnace under oxidizing conditions at a temperature from about 700° C. to about 950° C. until the lead oxide portion is substantially wholly present as $PbO_2$ and combined with the alkaline earth metal oxide. The degree of reaction should be such that at least 90% by weight of the lead is present in the form of combined $PbO_2$, and to accomplish this, a furnacing time of about 7-9 hours at an average temperature of about 800° C. will be found advantageous. After withdrawal from the furnace and cooling, the product will be found to consist of finely divided calcium plumbate.

In order to form the novel surface coating composition, the alkali earth metal plumbate is admixed with a film forming vehicle. Such vehicle may be oleaginous, as for instance, comprising a glyceride drying oil such as linseed oil or tung oil or maybe resinous, comprising a natural or synthetic resin in a suitable solvent; or it may be a combination of these. In addition, the vehicle may contain driers, thinners, and other auxiliary ingredients commonly used.

The admixture of pigment and vehicle may be accomplished by methods well known in the art, for example, by incorporation, mixing, and grinding. The completed composition will be found to have good paint qualities such as covering or obliterating power, brushability, stability, and keeping qualities. Its protective and anti-corrosive properties when applied to metal surfaces, particularly iron or steel are, however, outstanding. It will be found that the compositions according to this invention will afford protection at least comparable to the finest quality red lead paints. They may be used in application involving either atmospheric or underwater environment, and have been found to be very effective under conditions alternately wet and dry such as are encountered in marine and tidal exposures.

The anti-corrosive properties of the alkaline earth metal plumbate may be used to bolster the efficacy of pigments not so highly endowed with this quality. Thus, the anti-corrosive properties of other pigments such as iron oxide may be enhanced by the presence in the paint of alkaline earth metal plumbate. Moreover, the anti-corrosive properties of the alkaline earth metal plumbate are proportionally effective if the coating composition contains extender pigments for instance, magnesium silicate or barium or calcium carbonate. Extender or other pigments may, if desired, be added prior to or during the furnacing of the alkaline earth metal oxide and lead oxide ingredients if their composition so admits or they may be added at the time the pigment phase is incorporated into the vehicle.

To illustrate a preferred method of producing calcium plumbate, a charge consisting of 11.1 lbs. calcined litharge (PbO) and 10.1 lbs. ground limestone ($CaCO_3$), 54.8% CaO, 0.15% $SiO_2$, was intimately mixed by tumbling the ingredients together and then passing the mixture through a mill of the swing hammer type. The mixed charge was then placed on the hearth of an electric furnace and the temperature in the furnace raised to 750° C. as soon as possible. The temperature was then gradually raised and the charge intermittently rabbled to expose fresh surfaces. The temperature was controlled so that the final hour in a 9 hour calcining period was at 950° C. After the 9 hours' calcination, the charge was removed from the furnace and allowed to cool. The product was composed of pigmentary calcium plumbate of the following analysis:

| | Per cent |
|---|---|
| CaO | 32.0 |
| $PbO_2$ | 66.7 |
| PbO (total) | 63.4 |
| Percent Pb as combined $PbO_2$ | 98.4 |

The following examples will illustrate several surface coating compositions containing calcium plumbate according to this invention:

Example I

Illustrating a simple linseed oil-calcium plumbate paint.

| | Parts by weight |
|---|---|
| Calcium plumbate | 81.0% |
| Raw linseed oil | 18.0% |
| Metallic drier | 1.0% |

The above ingredients were mixed together to form a paint. The paint showed satisfactory paint qualities and was tested by applying by brushing to cold rolled steel panels. The coated panels were then subjected to an accelerated exposure test consisting of alternate exposure to air and immersion in a 3.6% NaCl solution. After 5 days exposure, the panels were found to be in a condition generally comparable to similar panels coated with red lead paint and similarly exposed.

Example II

Illustrating a composition containing boiled and bodied linseed oil in the vehicle and iron oxide and extender together with calcium plumbate in the pigment phase.

| | Parts by weight |
|---|---|
| Calcium plumbate | 63.6% |
| Indian red (iron oxide) | 4.1% |
| Magnesium silicate | 2.2 |
| Boiled linseed oil | 23.7 |
| Bodied linseed oil | 2.6 |
| Metallic drier | 2.1 |
| Volatile thinner | 1.7 |

The above ingredients were mixed together to form a paint. The paint showed satisfactory paint qualities and was then tested by applying to hot rolled structural steel sections and exposing these sections to the outside atmosphere for a period of one year. The protection afforded to the steel was comparable to that given by red lead paint under identical conditions.

Example III

Illustrating a composition containing a synthetic resin vehicle and iron oxide and extender together with calcium plumbate in the pigment phase.

| | Parts by weight |
|---|---|
| Calcium plumbate | 36.0% |
| Indian red (iron oxide) | 8.5% |
| Magnesium silicate | 12.8% |
| Litharge | 0.2 |
| Alkyd resin solution (70% solids) | 27.6% |
| Metallic drier | 0.3% |
| Volatile thinner | 14.6% |

The above ingredients were mixed together to form a paint. The paint showed satisfactory paint qualities and was tested by applying to hot rolled structural plate sections exposed to tide range seat water. After six months, the paint was found to have afforded protection generally comparable to that given by red lead paint under identical conditions.

Example IV

Illustrating a composition similar to that of Example III, but containing a natural resin vehicle.

| | Parts by weight |
|---|---|
| Calcium plumbate | 32.6% |
| Indian red (iron oxide) | 7.7% |
| Magnesium silicate | 11.6% |
| Cumarone—indene—coal tar resin | 28.2% |
| Volatile thinner | 19.9% |

The above ingredients were mixed into a paint. The paint showed good paint qualities and was tested by applying to hot rolled structural plate sections, top coated with antifouling paint and submerged in sea water. This exposure subjected the painted sections to the erosive effect of salt water as well as to various fouling marine organisms. After 15 months submersion, it was found that this paint had afforded protection comparable to that given by a red lead priming paint similarly top coated with the same antifouling paint.

To illustrate a preferred method of producing barium ortho-plumbate, a charge consisting of:

| | Pounds |
|---|---|
| Litharge (PbO) | 4.46 |
| Barium carbonate ($BaCO_3$) | 7.89 | was intimately mixed and then milled by passing through a swing hammer type mill. The mixed charge was furnaced at a temperature of 800° C. for 8 hours after which it was removed from the furnace and cooled. The product was found to be pigmentary barium plumbate of the following analysis:

| | |
|---|---|
| BaO | 51.0% |
| $PbO_2$ | 39.6% |
| PbO (total) | 38.0% |
| Percent Pb as combined $PbO_2$ | 90.1 |

To illustrate a method of producing barium meta-plumbate a charge consisting of:

| | Pounds |
|---|---|
| Litharge (PbO) | 29.1 |
| Barium oxide (BaO) | 19.6 | was mixed and milled as outlined above and then furnaced for 8 hours at a temperature of initially 700° C. which was raised during the later stage of the calcination to 900° C. The product was found to be pigmentary barium meta-plumbate of the following analysis:

| | |
|---|---|
| BaO | 39.0% |
| PbO$_2$ | 59.9% |
| PbO | 55.0% |
| Percent Pb as combined PbO$_2$ | 98.3 |

The following examples will illustrate several surface coating compositions containing barium ortho and meta-plumbate according to this invention.

Example V

Illustrating a linseed oil-barium ortho-plumbate paint.

| | Parts by weight |
|---|---|
| Barium ortho-plumbate | 68.8% |
| Raw linseed oil | 29.1 |
| Volatile thinner | 1.7 |
| Metallic drier | 0.4 |

The above ingredients were mixed together to form a paint.

Example VI

Illustrating a composition containing barium ortho-plumbate and a resinous vehicle.

| | Parts by weight |
|---|---|
| Barium ortho-plumbate | 57.0% |
| Alkyd resin solution (70% solids) | 28.2 |
| Volatile thinner | 14.4 |
| Metallic drier | 0.4 |

The above ingredients were mixed together to form a paint.

Example VII

Illustrating a composition containing barium meta-plumbate and a resinous vehicle.

| | Parts by weight |
|---|---|
| Barium meta-plumbate | 62.9% |
| Alkyd resin solution (70% solids) | 24.3 |
| Volatile thinner | 12.4 |
| Metallic drier | 0.4 |

The above ingredients were mixed together to form a paint.

Exposure tests on the paints of Examples V, VI, and VII above showed excellent rust inhibitive and protective properties when applied to iron or steel surfaces.

The presence of the lead in the alkaline earth metal plumbate substantially wholly as combined PbO$_2$ has been found necessary to prevent undue reaction of the pigment with common paint vehicles. It is preferred to have 95% or more of the lead content present as combined PbO$_2$, and at least 90% is essential.

While this invention has been described and illustrated by the examples shown, it is not intended to be limited thereto, and other embodiments and variations may be employed as limited by the following claims.

We claim:

1. An anti-corrosive paint comprising in admixture, a vehicle selected from the class consisting of resinous and oleaginous film forming and drying vehicles and a plumbate of an alkaline earth metal in which at least 90% by weight of the lead is present as lead peroxide combined with an alkaline earth metal oxide.

2. An anti-corrosive paint comprising in admixture, a resinous film forming and drying vehicle and a plumbate of an alkaline earth metal in which at least 90% by weight of the lead is present as lead peroxide combined with an alkaline earth metal oxide.

3. An anti-corrosive paint comprising in admixture, an oleaginous film forming and drying vehicle and a plumbate of an alkaline earth metal in which at least 90% by weight of the lead is present as lead peroxide combined with an alkaline earth metal oxide.

4. An anti-corrosive oil paint comprising as a vehicle constituent a glyceride drying oil and as a pigment constituent, a plumbate of an alkaline earth metal in which substantially the whole of the lead is present as lead peroxide combined with an alkaline earth metal oxide.

5. An anti-corrosive paint comprising, in admixture, glyceride drying oil vehicle and a plumbate of an alkaline earth metal in which at least 90% by weight of the lead is present as lead peroxide combined with an alkaline earth metal oxide.

6. An anti-corrosive paint comprising, in admixture, glyceride drying oil vehicle, a plumbate of an alkaline earth metal in which at least 90% by weight of the lead is present as lead peroxide combined with an alkaline earth metal oxide and another pigment.

7. An anti-corrosive oil paint comprising as a vehicle constituent a glyceride drying oil and as a pigment constituent an admixture of an alkaline earth metal plumbate and iron oxide, at least 90% of the lead in said plumbate being present as lead peroxide combined with an alkaline earth metal oxide.

8. An anti-corrosive paint comprising, in admixture, a linseed oil vehicle and a plumbate of an alkaline earth metal in which at least 90% by weight of the lead is present as lead peroxide combined with an alkaline earth metal oxide.

9. An anti-corrosive paint comprising in admixture a vehicle selected from the class consisting of resinous and oleaginous film forming and drying vehicles and, as a pigment constituent, calcium plumbate in which at least 90% of the lead is present as lead peroxide combined with calcium oxide.

FRANCIS J. WILLIAMS.
EDGAR H. HERRMANN.

REFERENCES CITED

The following references are of record in the file of this patent:

UNITED STATES PATENTS

| Number | Name | Date |
|---|---|---|
| 430,653 | Kasner | June 24, 1890 |
| 1,441,168 | Peters | Jan. 2, 1923 |
| 2,406,307 | Read | Aug. 20, 1946 |

FOREIGN PATENTS

| Number | Country | Date |
|---|---|---|
| 601,183 | France | Nov. 26, 1925 |
| 11,899 | Great Britain | 1889 |
| 11,962 | Great Britain | 1889 |

OTHER REFERENCES

Mellor, "Comprehensive Treatise on Inorganic and Theoretical Chemistry, vol. 7, pages 698 and 699, Longmans, Green & Co., 1927.